(12) United States Patent
Thomasset

(10) Patent No.: US 8,916,247 B2
(45) Date of Patent: Dec. 23, 2014

(54) THERMOPLASTIC TUBULAR PACKAGING BODY WITH AN EMBEDDED STRIP

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 1274 days.

(21) Appl. No.: 12/296,192

(22) PCT Filed: Apr. 6, 2007

(86) PCT No.: PCT/IB2007/051249
§ 371 (c)(1),
(2), (4) Date: Oct. 22, 2008

(87) PCT Pub. No.: WO2007/113782
PCT Pub. Date: Oct. 11, 2007

(65) Prior Publication Data
US 2009/0286025 A1 Nov. 19, 2009

(30) Foreign Application Priority Data

| Apr. 6, 2006 | (WO) | .................. PCT/IB2006/051052 |
| Jul. 31, 2006 | (EP) | ..................................... 06118170 |
| Jul. 31, 2006 | (EP) | ..................................... 06118199 |
| Nov. 24, 2006 | (WO) | .................. PCT/IB2006/054420 |

(51) Int. Cl.
*B29C 65/02* (2006.01)
*B32B 1/08* (2006.01)
(Continued)

(52) U.S. Cl.
CPC ......... *B29C 65/5042* (2013.01); *B29C 65/5021* (2013.01); *B29C 65/505* (2013.01); *B29C*
(Continued)

(58) Field of Classification Search
CPC ........ B32D 35/02; B32D 35/10; B29C 65/50; B29C 65/5042; B29C 65/505
USPC ........... 428/35.2, 36.9, 57, 58, 34.8; 220/678, 220/679; 426/105; 206/802
See application file for complete search history.

(56) References Cited

U.S. PATENT DOCUMENTS 3,071,503 A * 1/1963 Dubois ......................... 156/157
3,531,362 A * 9/1970 McDonald et al. ............. 428/61
(Continued)

FOREIGN PATENT DOCUMENTS

| EP | 0 097 689 | 1/1984 |
| EP | 0 177 470 | 4/1986 |

(Continued)

OTHER PUBLICATIONS

English translation of Written Opinion (IPRP—Chapter I).
(Continued)

*Primary Examiner* — Michele L Jacobson
(74) *Attorney, Agent, or Firm* — Nixon & Vanderhye P.C.

(57) ABSTRACT

The invention relates to a tubular packaging body formed from a laminate composed of at least one thermoplastic whose ends are fastened by welding and covered by a welded or bonded strip. The tubular body according to the invention is characterized in that said strip is at least partially embedded in the laminate.
The invention also relates to methods for manufacturing said tubular body.

17 Claims, 2 Drawing Sheets

(51) Int. Cl.
| | |
|---|---|
| B29C 65/50 | (2006.01) |
| B29C 65/00 | (2006.01) |
| B32B 27/08 | (2006.01) |
| B32B 37/00 | (2006.01) |
| B32B 7/12 | (2006.01) |
| B32B 27/30 | (2006.01) |
| B32B 27/32 | (2006.01) |
| B32B 27/36 | (2006.01) |
| B32B 3/04 | (2006.01) |
| B32B 3/08 | (2006.01) |
| B29C 53/36 | (2006.01) |
| B29K 23/00 | (2006.01) |
| B29K 67/00 | (2006.01) |
| B29K 77/00 | (2006.01) |
| B29K 101/12 | (2006.01) |
| B29K 305/02 | (2006.01) |
| B29L 9/00 | (2006.01) |
| B29L 23/20 | (2006.01) |
| B29L 31/00 | (2006.01) |
| B65D 75/06 | (2006.01) |

(52) U.S. Cl.
CPC . 66/1142 (2013.01); *B29C 66/4322* (2013.01); *B29C 66/723* (2013.01); *B29C 66/72321* (2013.01); *B29C 66/7371* (2013.01); *B32B 1/08* (2013.01); *B32B 27/08* (2013.01); *B32B 37/00* (2013.01); *B32B 7/12* (2013.01); *B32B 27/306* (2013.01); *B32B 27/32* (2013.01); *B32B 27/36* (2013.01); *B32B 3/04* (2013.01); *B32B 3/08* (2013.01); *B29C 53/36* (2013.01); *B29C 66/0222* (2013.01); *B29C 66/0224* (2013.01); *B29C 66/1122* (2013.01); *B29C 66/14* (2013.01); *B29C 66/61* (2013.01); *B29K 2023/00* (2013.01); *B29K 2023/06* (2013.01); *B29K 2023/0625* (2013.01); *B29K 2023/0633* (2013.01); *B29K 2023/065* (2013.01); *B29K 2023/086* (2013.01); *B29K 2023/12* (2013.01); *B29K 2067/00* (2013.01); *B29K 2077/00* (2013.01); *B29K 2101/12* (2013.01); *B29K 2305/02* (2013.01); *B29K 2995/0053* (2013.01); *B29K 2995/0069* (2013.01); *B29L 2009/00* (2013.01); *B29L 2009/003* (2013.01); *B29L 2023/20* (2013.01); *B29L 2031/712* (2013.01); *B65D 75/06* (2013.01); *B32B 2307/412* (2013.01); *B32B 2307/518* (2013.01); *B32B 2439/00* (2013.01)
USPC .................................. 428/35.7; 428/35.2

(56) References Cited

U.S. PATENT DOCUMENTS

| | | | | |
|---|---|---|---|---|
| 3,927,233 | A | * | 12/1975 | Naidoff .......................... 428/58 |
| 3,949,896 | A | * | 4/1976 | Luc ............................... 220/680 |
| 4,092,450 | A | * | 5/1978 | Haren .......................... 428/40.1 |
| 4,156,054 | A | * | 5/1979 | Gurewitsch ................... 428/583 |
| 4,398,982 | A | * | 8/1983 | Witerski et al. ............... 156/157 |
| 4,399,839 | A | * | 8/1983 | Hutschenreuter et al. . 138/118.1 |
| 4,401,135 | A | * | 8/1983 | Andra et al. ............... 138/118.1 |
| 4,401,136 | A | * | 8/1983 | Porrmann et al. ......... 138/118.1 |
| 4,410,011 | A | * | 10/1983 | Andra et al. ............... 138/118.1 |
| 4,685,591 | A | * | 8/1987 | Schaefer et al. .............. 222/107 |
| 4,690,668 | A | * | 9/1987 | Rebmann et al. ............. 493/297 |
| 4,733,800 | A | * | 3/1988 | Bjorkengren et al. ........ 222/107 |
| 4,746,391 | A | * | 5/1988 | Heyse et al. .................. 156/359 |
| 5,197,935 | A | * | 3/1993 | Schweri .......................... 493/85 |
| 5,419,859 | A | * | 5/1995 | Hartman et al. ................ 264/51 |
| 5,427,849 | A | * | 6/1995 | McClintock et al. .......... 428/353 |
| 5,672,398 | A | * | 9/1997 | Johnson ....................... 428/35.7 |
| 5,823,683 | A | * | 10/1998 | Antonacci et al. ............ 383/107 |
| 5,843,552 | A | * | 12/1998 | Karrfalt .......................... 428/57 |
| 6,254,709 | B1 | * | 7/2001 | Kamiyama et al. ............. 156/91 |
| 6,540,132 | B1 | * | 4/2003 | Lowry et al. .............. 229/117.12 |
| 6,951,676 | B2 | * | 10/2005 | Shaw ............................ 428/40.1 |
| 6,994,912 | B2 | * | 2/2006 | Grund et al. ................ 428/474.4 |
| 7,527,839 | B2 | * | 5/2009 | Busche et al. ................ 428/34.9 |
| 2009/0092792 | A1 | * | 4/2009 | Thomasset et al. ........... 428/157 |
| 2009/0176044 | A1 | * | 7/2009 | Thomasset et al. ........... 428/35.2 |
| 2010/0000674 | A1 | * | 1/2010 | Voigtmann .................... 156/280 |

FOREIGN PATENT DOCUMENTS

| | | |
|---|---|---|
| EP | 0 187 541 | 7/1986 |
| JP | 8301312 A | 11/1996 |
| JP | 10-220676 | 8/1998 |

OTHER PUBLICATIONS

International Search Report for PCT/IB2007/051249, mailed Sep. 25, 2007.

* cited by examiner

THERMOPLASTIC TUBULAR PACKAGING BODY WITH AN EMBEDDED STRIP

This application is the U.S. national phase of International Application No. PCT/IB2007/051249, filed 6 Apr. 2007, which designated the U.S. and claims priority to National Phase Application PCT/IB2006/05 1052 filed 6 Apr. 2006, European Application no.(s) 06118170.7 filed 31 Jul. 2006, 06118199.6 filed 31 Jul. 2006 and National Phase of PCT/IB2006/054420 filed 24 Nov. 2006, the entire contents of each of which are hereby incorporated by reference.

FIELD OF THE INVENTION

The invention lies in the field of flexible tubes formed using plastic films. More specifically, it relates to a flexible tube whose ends are butt-welded.

PRIOR ART

Many flexible tubes are made by welding the ends of a laminate containing at least one plastic layer.

The most common method of welding consists in forming an overlap of the ends of the laminate and in joining the inner face onto the upper face of the laminate. This joint has many advantages as it makes it possible especially to obtain a high strength in the weld zone, to guarantee the hygiene properties in regard to the packaged product and to ensure good barrier and sealing properties. However, this joint may prove inadequate for packaging aggressive products that migrate into the weld zone and result in delamination of the laminate. This packaging also has the drawback of having a significant overthickness at the weld zone, which ruins the aesthetic properties of the packaging.

Patent application EP 0 187 541 (FIG. 1) proposes the use of a strip welded inside the tube in order to protect the weld zone from the migration of aggressive products. FIG. 1 illustrates a joint 1 for packaging products containing cyanoacrylates. According to the preferential embodiment of the invention, the laminate 2 comprises a first high-density polyethylene (HDPE) layer 5 in contact with the packaged product, an aluminium layer 4 and a second HDPE layer 3 on the outer surface. The laminate 2 also comprises a polyethylene imine (PEI) layer and an ethylene/acrylic acid copolymer (EAA) layer between the layers 5 and 4 and also an EAA layer between the layers 4 and 3 in order to ensure good adhesion between the layers 3, 4 and 5. The ends of the laminate 2 form an overlap in the weld zone 6. The HDPE strip 7 is welded onto the inner face of the joint 1 and is located inside the tube. The strip 7 enables the diffusion of cyanoacrylates into the weld zone to be slowed down and avoids delamination problems.

U.S. Pat. No. 4,733,800 (FIG. 2) discloses the use of a strip welded to the inside of a plastic tube in order to eliminate the spring-back effect of the packaging when it is compressed to extract the product. This lack of spring-back, also known as "dead-fold" by a person skilled in the art, lets air enter into the packaging as the latter is emptied, which results in an accelerated oxidation of the packaged product. To overcome this drawback, U.S. Pat. No. 4,733,800 proposes the use of a strip welded inside the tube comprising a metal layer. The tube is formed by the joint 1 of a butt-welded laminate 2. Said laminate 2 comprises at least one metal layer 4 having a thickness between 5 and 40 microns and a weldable layer 5. The strip 7 welded onto the inner face of the joint 1 is superposed over the ends of the laminate 2 at the butt-welding zone 6. The strip 7 located on the inside of the tube comprises at least one metal layer having a thickness between 40 and 200 microns and also two weldable layers 8 and 10. Said strip 7 makes it possible to prevent the spring-back of the tube during extraction of the product, and reinforces the weld zone due to the thickness of the metal layer 9. However, the invention described in U.S. Pat. No. 4,733,800 has several major drawbacks. A first drawback lies in the fact that the metal layer 9 is in direct contact with the packaged product which creates problems when the product is food. A second drawback is linked to the large thickness of the strip which makes joining the tube head onto the tubular body difficult, or even impossible.

Patent Application JP 06166107 (FIG. 3) proposes the use of a strip welded inside the tube in order to overcome the drawbacks of welding by overlapping the ends of the laminate. Patent Application JP 06166107 especially proposes preventing contact of the barrier layers with the packaged product by positioning the ends of the laminate so that they abut and by welding a strip which joins said ends. A tube is formed from the joint 1 of a laminate 2 whose ends are positioned so that they abut. The ends 6 are not welded together; they are joined via the strip 7 welded onto the inner face of the laminate. According to the Patent Application JP 06166107 the strip may comprise several layers and the welded layer is of identical nature to the lower layer 5 of the laminate. The invention described in Patent Application JP 06166107 is advantageous for joining non-weldable laminates so that they abut. However, it has several drawbacks. A first drawback is aesthetics-related as the outer surface of the tube includes a break in its outer surface at the butt joint 6. A second drawback is linked to the overthickness created by the inner strip which makes joining the tube head onto the tubular body difficult.

Problem to be Solved

The addition of a strip joining the ends of a butt-welded laminate in order to form tubular bodies has many advantages. However, the tubes formed from these tubular bodies have several drawbacks.

When the strip is welded or bonded onto the outer surface of the laminate, defects may appear during printing of the tubular body; these defects in the decoration being linked to the overthickness created by the strip. Another drawback of the addition of a strip onto the outer surface of the packaging is linked to the fact that the consumer may feel the overthickness of the strip when holding the packaging. The sensation created is particularly damaging to the use of these tubes in the cosmetics market.

When the strip is added onto the inner surface of the tubular body, it is the welding of the tube head onto the tubular body that poses difficulties. Indeed, it is observed that the overthickness created by the strip leads to a risk of the packaging leaking at the welded head.

DEFINITION OF THE TERMS USED IN THE SUMMARY OF THE INVENTION

In the summary of the invention the following terms and abbreviations are used:
Laminate: multilayer film resulting from the lamination of several films.
BOPET: biaxially-oriented polyethylene terephthalate.
BOPP: biaxially-oriented polypropylene.
BOPA: biaxially-oriented polyamide.
PE: polyethylene.
LDPE: low-density polyethylene.
LLDPE: linear low-density polyethylene.

HDPE: high-density polyethylene.

EVOH: ethylene-vinyl alcohol.

Adhesive: adhesive used during preparation of laminates to join several films.

Glue: adhesive product used to bond the strip onto the laminate.

Welding: the welding operation aims to join, by melting, two materials of the same nature or that are miscible in the melt state, said miscibility being manifested by the diffusion and interpenetration of the molecular chains; then by cooling said materials in order to freeze the state of molecular interpenetration.

Bonding: unlike welding, bonding is defined as an operation for joining two materials that are not of the same nature or that are immiscible in the melt state. Bonding may take place by chemical mechanisms (reaction of the chain ends, crosslinking), or physical mechanisms (van der Waals forces, evaporation). Bonding is a joining operation which may be carried out at room temperature or by heating the materials.

GENERAL SUMMARY OF THE INVENTION

The invention consists in embedding, at least partially, the welded strip into the laminate so that the thickness of the welded strip that sticks out is less than the thickness of said strip.

In the present text, as will subsequently be seen, the term "embed" means either "insert into a recessed surface" or "push into a surface that is initially lacking a recess".

According to one embodiment of the invention, the strip is embedded in the laminate and the respective surfaces of the laminate and of the strip are tangential.

The first embedding method consists in exerting a pressure on said strip in order to make it penetrate into the thickness of the laminate when the latter is in an at least partially molten state.

A second method consists in embedding the strip into a laminate in the solid state and comprises at least one operation for pressurizing the strip.

A third method of embedding the strip is based on a deformation of the laminate prior to application of the strip. This method comprises a step of cold or hot deformation of the laminate in order to create the location for the strip.

A fourth embedding method consists in creating the location of the strip by removing material. The thickness of the laminate is reduced locally level with the ends in order to create the location of the strip.

To ease insertion of the strip, the edges of said strip may be chamfered.

When the strip is embedded into the outer surface of the packaging, the attractiveness of the packaging is not ruined.

When the strip is embedded into the inner surface of the packaging, welding of the component onto the tubular body remains of high quality.

The invention will be better understood from the description of the embodiments of these and from the following figures in which:

FIGS. 1 to 3 describe the main uses of a welding strip known in the prior art for joining the welded ends of a laminate.

Figure 1:
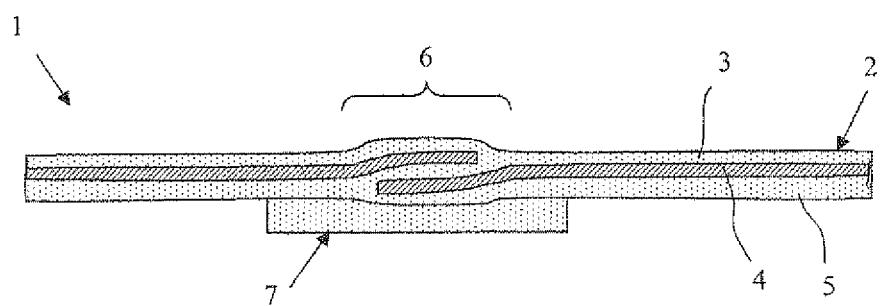
FIG. 1 illustrates the use of a strip to limit the migration of aggressive components contained in the packaging.
Figure 2:
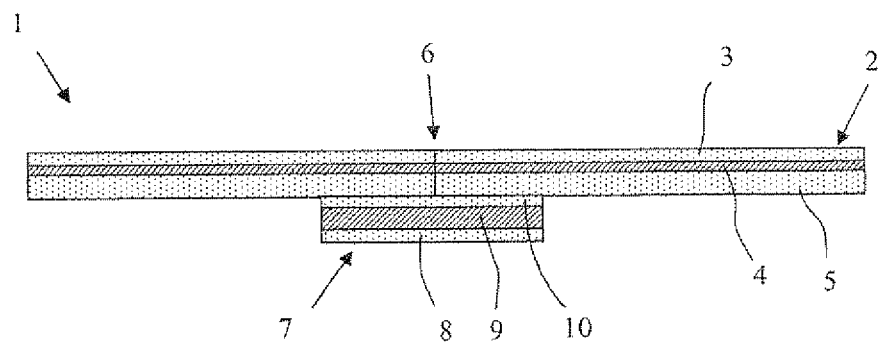
FIG. 2 illustrates the use of a strip to eliminate the spring-back effect of the tube when it is compressed to extract the product.
Figure 3:
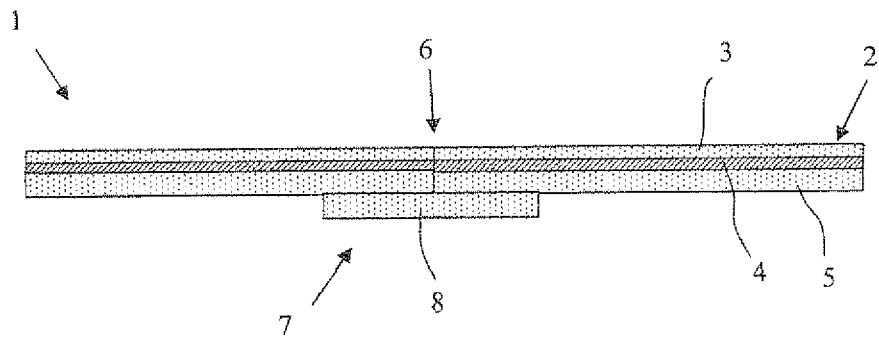
FIG. 3 illustrates the use of a strip welded to the inside of the tube in order to overcome the drawbacks of welding by overlapping the ends of the laminate.
Figure 4:
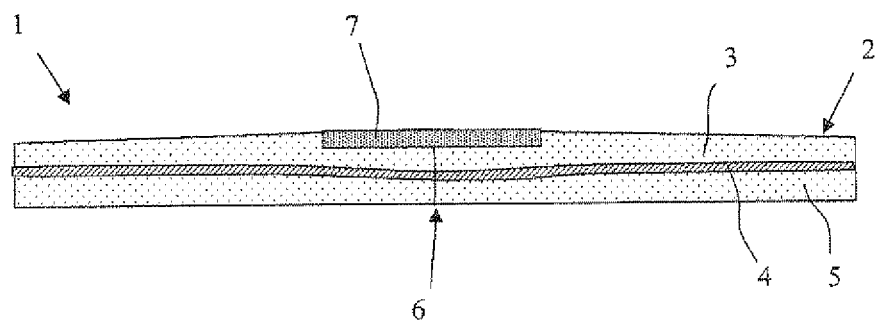
FIGS. 4 to 6 illustrate several embodiments of the invention.

FIG. 4 presents a first exemplary embodiment of the invention consisting in at least partially embedding the strip into the layer forming the surface of the packaging.

Figure 5:
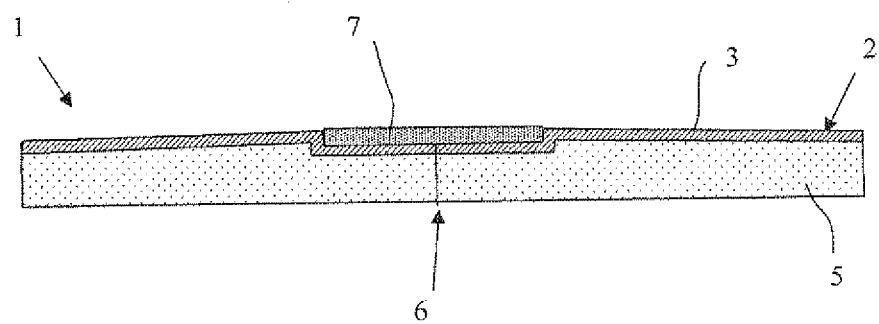

FIG. 5 presents another exemplary embodiment of the invention consisting in at least partially embedding the strip into the thickness of the laminate.

Figure 6:
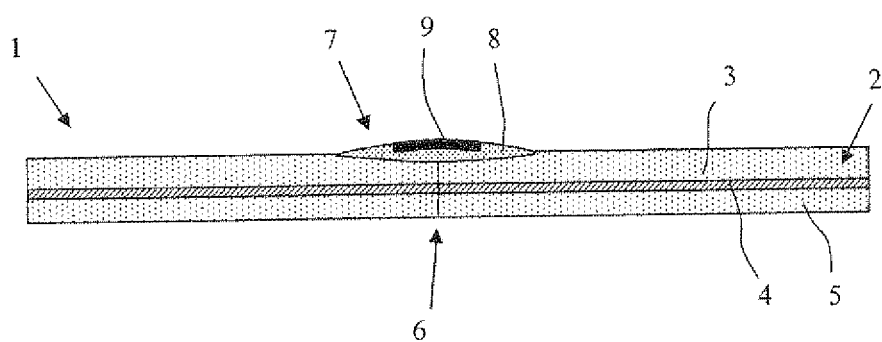

FIG. 6 illustrates a third exemplary embodiment of the invention consisting in embedding and deforming the strip.

DETAILED SUMMARY OF THE INVENTION

The invention consists of a novel method for preparing a tube by butt-welding the ends of a laminate; the method consisting in adding a strip joining the ends of the laminate and in at least partially embedding said strip into the surface of the laminate so as to eliminate the unattractivenes and adverse technical effects linked will the presence of said strip; and in order to improve the strength of the joint.

FIG. 4 illustrates a first exemplary embodiment of the invention. A tubular body 1 is formed by butt-welding the ends of a laminate 2. A strip 7 joins the ends of the laminate and reinforces the weld zone 6. The invention is characterized in that the strip 7 is embedded in the layer 3 forming the upper surface of the laminate. Preferably, the thickness of the strip that sticks out is less than its half thickness.

Ideally, said strip is completely embedded in the laminate so that the surface of the joint forms a smooth and continuous surface.

The laminate illustrated in FIG. 4 comprises a layer 3 forming the upper surface of the laminate; a second layer 5 forming the lower surface of the laminate and a layer 4 trapped between the layers 3 and 5; said layers 3, 4 and 5 may possibly be of different natures; and said layers 3, 4 and 5 being joined together at their interface. The laminate 2 generally comprises one or more layers that cannot be butt-welded. The layer 4 forming a thin layer having barrier properties is not generally welded at its ends. The layer 4 is, for example, an aluminium foil or an EVOH (ethylene-vinyl alcohol) layer. In FIG. 4, the layer 5 forming the inner surface of the tube is welded at its ends in order to guarantee correct preservation of the packaged product and to prevent the packaged product from coming into contact with the unwelded ends of said laminate 2. A layer 5 made of polyolefin is advantageous. The strip 7 is attached to the upper layer 3 by welding or bonding. When the strip 7 is welded, the strip 7 comprises at least one layer of the same nature as the upper layer 3 of the laminate. When the strip 7 is welded, the layer 3 is advantageously composed of polyolefin (PE or PP).

The strip 7 illustrated in FIG. 4 is preferentially of small thickness in order to make it easier to embed in the layer 3 of the laminate; said thickness usually being less than the half thickness of the laminate in order to prevent a significant overthickness at the weld zone 6. The strip 7 advantageously comprises several layers, of which one is a high-strength layer and one is a low-thickness layer. This high-strength layer is, for example, made from a biaxially-oriented polymer. The strip may also contain a thin layer having a barrier effect. The strip 7 also comprises a tie layer with the layer 3 of the laminate; this tie layer being of the same nature as the layer 3 when the strip is welded; this layer being an adhesive when the strip is bonded onto said layer 3. With a strip comprising several layers, the thickness of the strip may be reduced and embedding it in the thickness of the laminate may be facilitated. The strip 7 makes it possible to increase the strength of the weld zone 6 and to overcome the fact that the butt-welding of the ends of the laminate has a lower strength than that of the laminate. At the very least, the strip compensates for the fact that some layers of the laminate are not welded.

FIG. 4 illustrates embedding a strip 7 into the upper surface of a laminate 2 forming the outer surface of a tubular body 1. According to another embodiment of the invention, the strip 7 is embedded in the lower layer 5 of the laminate forming the inner layer of the packaging. According to this embodiment, the strip 7 comprises at least one layer which is welded onto the layer 5 of the laminate. Preferably, the strip 7 comprises one layer of the same nature as layer 5 of the laminate; usually said layer 5 is a polyolefin layer. The strip 7 preferentially comprises a thin biaxially-oriented polymer layer trapped between two weldable layers; a first layer enabling the strip 7 to be welded to the layer 5, and a second layer enabling the strip 7 to be welded onto the tube head that is joined to the inner layer 5 of the tubular body 1.

Another embodiment of the invention consists in embedding only the edges of said strip 7; said strip 7 possibly being embedded into the upper layer 3 or the lower layer 5 of the laminate 2.

FIG. 5 illustrates another example of embedding a strip into a laminate comprising at least two layers; a first upper layer 3 forming the upper surface of the laminate and a second layer 5 forming the lower surface of the laminate and the inner surface of the packaging. The strip 7 is fastened to the layer 3 forming the upper layer of the packaging and embedded in the thickness of the laminate; embedding of the strip 7 into the thickness of the layer 3 not being possible on account of the thickness or the properties of said layer 3. FIG. 5 illustrates bonding of the strip 7 onto the layer 3. Bonding of the strip 7 is particularly advantageous when the upper layer 3 is a biaxially-oriented polymer (BOPET or BOPP) layer or when the upper layer 3 is printed on its outer surface. A strip comprising one biaxially-oriented polymer layer and one adhesive layer is particularly advantageous on account of its very small thickness and its high transparency. FIG. 5 illustrates the fact that the strip is attached to the layer 3 and embedded in the laminate by deforming the lower layer 5.

FIG. 6 illustrates a third example of embedding a strip into the thickness of a laminate. A tubular body 1 is formed from a laminate 2 whose ends are butt-welded. The laminate comprises a layer 3 forming the upper surface of the laminate; a layer 4 forming the lower surface of the laminate and the inner surface of the packaging; and a layer 4 trapped between the layers 3 and 5. Generally, the layer 4 of the laminate is not butt-welded on account of its small thickness or its properties. A strip 7 is attached to the layer 3 of the laminate and strengthens the weld zone 6. The strip 7 illustrated in FIG. 6 comprises at least two layers; a first layer 9 of high strength and of small thickness; and a second layer 8 which is welded onto the layer 3 of the laminate. Preferentially, the layers 8 and 3 are of the same nature. The strip 7 is welded and embedded into the layer 3 of the laminate. The strip 7 is deformed by the flow of layer 8 at the time said strip is embedded in the thickness of the laminate.

Several methods for embedding the strip in the thickness of the laminate may be envisaged.

A first method of embedding the strip consists in pushing the strip into an at least partially molten laminate and comprises at least one operation of putting pressure on the strip. Embedding the strip may be carried out together with or after the butt-welding of the laminate, and together with or after the welding or bonding of the strip onto the laminate.

A second method of embedding the strip consists in pushing the strip into a laminate in the solid state and comprises at least one operation of putting pressure on the strip. Embedding the strip is carried out after the butt-welding of the laminate and together with or after the welding or bonding of the strip onto the laminate.

A third method of embedding the strip is based on a deformation of the laminate prior to the application of the strip. This method comprises a step of hot or cold deformation of the laminate in order to create the location of the strip. The deformation of the laminate is preferentially carried out when it is flat, before joining the ends of the laminate so that they abut.

A fourth embedding method consists in creating the location of the strip by removing material. The thickness of the laminate is reduced locally level with the ends in order to create the location of the strip.

The joint illustrated in FIG. 4 may be obtained by using the first embedding method. According to this method, at least layer 3 of the laminate 2 is heated in order to make it melt. A pressure is then exerted on the strip 7 in order to embed it in the layer 3. When the pressure is exerted on the strip 7, the layer 3, which is molten, is deformed. According to this method, the layer 3 must be heated over a width that is greater than or equal to the width of the strip 7. If several layers of the laminate are heated during the embedding of the strip 7, all of said heated layers may be deformed. In general, the deformation of the layers is controlled by the desired thickness of the weld zone, the thickness of the weld zone being greater than or equal to the thickness of the laminate. Finally, the joint is cooled at the weld zone and the embedding zone.

When only the edges of the strip 7 are embedded in the laminate, the first embedding method consists in exerting at least a pressure on said edges to be embedded.

The use of the first method for embedding the strip 7 is also illustrated in FIG. 5. The first step of the method consists in heating at least the layer 5 of the laminate in order to make it melt; in applying a pressure to the strip 7 in order to embed it in the laminate; and in cooling the joint.

FIG. 6 illustrates another joint resulting from the use of the first embedding method. The joint is characterized by a deformation of the laminate and the strip at the weld zone. This method of embedding the strip 7 in the layer 3 of the laminate 2 comprises a first step consisting in heating at least the layers 3 and 8 in order to make them melt; a second step of putting the strip 7 under pressure; and finally a third step of cooling the joint. When the pressure is exerted on the strip 7, the layers 3 and 8, which are molten, are deformed. According to this method, the layer 3 must be heated over a width greater than or equal to the width of the strip 7. If several layers of the laminate are heated during the embedding of the strip 7, all of said heated layers may be deformed. The deformation of the strip by flow of the layer 8 is particularly advantageous as it stops the edges of said strip from protruding, and leads to a more homogeneous thickness of the weld zone. This method enables a strip to be embedded in the outer or inner surface of the packaging.

In order to prevent the edges of said strip from protruding and in order to facilitate the embedding operation, a bevel cut of the edges of the strip is particularly advantageous.

The embedded strip 7 may be printed or transparent; it may be bonded or welded onto the surface of the laminate; it may contain a barrier layer in order to compensate for a possible discontinuity of the barrier layer at the weld zone. Preferentially, the thickness of said strip is less than the half thickness of the laminate.

The invention is particularly advantageous as it enables packaging to be produced by butt-welding of films that combine butt-weldable layers with layers that cannot be butt-welded. The invention enables the ends of a film to be joined so that they abut, the ends of which film are partially welded together.

The invention makes it possible to obtain welded packaging with a negligible variation in the thickness at the weld zone and having a weld zone strength that is equivalent to the strength of the film. The packaging obtained may be printed over its entire surface without a break in the printing in the weld zone. The invention makes it possible to obtain packaging having a high strength and improved aesthetics.

The invention is not limited to the examples illustrated in FIGS. 4 to 6. In particular, it relates not only to tubes whose ends are butt-welded, but also to tubes whose ends overlap.

Furthermore, the invention also applies to strips embedded in the inner surface of the tubes.

The invention claimed is:

1. A packaging for cosmetics comprising:
    a tubular packaging body formed from a laminate comprising at least one thermoplastic,
    wherein the laminate has ends that are fastened by welding and which thereby forms a flexible laminate tube,
    wherein the fastened ends are covered by a welded or bonded strip on the laminate tube,
    wherein said strip consists of polymeric material and is at least partially embedded in the laminate.

2. The packaging according to claim 1, wherein said ends are butt-welded, and comprising a weld zone having a thickness being less than the sum of the thickness of the laminate and of the strip prior to any welding.

3. The packaging according to claim 1, wherein the strip is embedded in an outer surface of the laminate.

4. The packaging according to claim 1, wherein the strip is entirely embedded in the laminate.

5. The packaging body according to claim 1, wherein said strip has ends that are chamfered.

6. Method for manufacturing a packaging according to claim 1, comprising a step of embedding the strip in the laminate which comprises exerting a pressure on said strip in order to make it penetrate into the thickness of the laminate.

7. Method according to claim 6, in which the laminate is at least partially melted at the time the strip is embedded.

8. Method according to claim 6, in which the laminate is in a solid state at the time the strip is embedded.

9. Method for manufacturing a packaging according to claim 1, comprising a step of preparing a recess in the laminate followed by a step during which the strip is placed into the recess.

10. Method according to claim 8, in which the recess is prepared by deforming the material.

11. Method according to claim 8, in which the recess is prepared by removing material.

12. The packaging body according to claim 1, wherein the tubular packaging body formed from the laminate and strip has a laminate and strip thickness designed for use in flexible packaging tubes for cosmetics.

13. The packaging body according to claim 1, wherein the strip is partially embedded in the laminate.

14. A packaging for cosmetics comprising:
    a tubular packaging body formed from a laminate comprising at least one thermoplastic,
    wherein the laminate has ends that are fastened by welding and which thereby forms a flexible laminate tube,
    wherein the fastened ends are covered by a welded or bonded strip on the laminate tube,
    wherein the strip consists of polymeric material and is partially embedded in the laminate.

15. The packaging according to claim 14, wherein said ends are butt-welded, and comprising a weld zone having a thickness being less than the sum of the thickness of the laminate and of the strip prior to any welding.

16. The packaging according to claim 14, wherein the strip is partially embedded in an outer surface of the laminate.

17. The packaging body according to claim 14, wherein said strip has ends that are chamfered.

* * * * *